(12) United States Patent
Chen et al.

(10) Patent No.: US 7,456,843 B2
(45) Date of Patent: Nov. 25, 2008

(54) METHOD AND APPARATUS FOR IMPROVED COLOR CORRECTION

(75) Inventors: Kok Chen, Sunnyvale, CA (US); Gabriel G. Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 11/008,890

(22) Filed: Dec. 10, 2004

(65) Prior Publication Data

US 2005/0099429 A1    May 12, 2005

Related U.S. Application Data

(63) Continuation of application No. 10/112,281, filed on Mar. 29, 2002, now Pat. No. 6,844,881.

(51) Int. Cl.
*G09G 5/02* (2006.01)
(52) U.S. Cl. .................. 345/589; 348/254; 358/519
(58) Field of Classification Search .................. 345/89, 345/589–591, 600, 690, FOR. 166; 348/254–258, 348/671, 674, 675; 382/167, 169, 274
See application file for complete search history.

(56) References Cited

U.S. PATENT DOCUMENTS

| | | | |
|---|---|---|---|
| 5,381,349 A | 1/1995 | Winter et al. | |
| 5,412,433 A | 5/1995 | Holland et al. | |
| 5,459,678 A | 10/1995 | Feasey | ........................ 358/518 |
| 5,483,259 A | 1/1996 | Sachs | ........................ 345/600 |
| 5,512,961 A | 4/1996 | Cappels, Sr. | |
| 5,546,105 A | 8/1996 | Leak | |
| 6,285,350 B1 | 9/2001 | Ijntema et al. | |
| 6,862,012 B1* | 3/2005 | Funakoshi et al. | ............ 345/88 |
| 2002/0018129 A1 | 2/2002 | Ikeda | |
| 2002/0180998 A1 | 12/2002 | Wu | |
| 2003/0034986 A1* | 2/2003 | Fukasawa | ........................ 345/591 |
| 2003/0058202 A1 | 3/2003 | Evanicky et al. | ............ 345/82 |

OTHER PUBLICATIONS

Peter G. Engeldrum and John L. Ingraham: "Analysis of White Point and Phosphor Set Differences of CRT Displays", *Color Research and Application*, vol. 15, No. 3, pp. 151-155, Jun. 1990.

(Continued)

*Primary Examiner*—Matthew C. Bella
*Assistant Examiner*—Gregory F Cunningham
(74) *Attorney, Agent, or Firm*—Blakely, Sokoloff, Taylor & Zafman LLP

(57) ABSTRACT

Methods and apparatuses for performing gamma corrections to maintain a plurality of colors substantially consistent with a color point. In one aspect of the present invention, a method to generate correction functions for performing color correction for a device for signals of different color components in a color space includes: generating a first correction function for a first color component in the color space; and generating second correction functions for second color components in the color space by reducing first color differences between a target White point and white points of a plurality of grays corrected by the first and second correction functions. The second color components are the color components in the color space other than the first color component. The first color differences are minimized relative to a chromaticity diagram.

8 Claims, 11 Drawing Sheets

OTHER PUBLICATIONS

Steven M. Boker: "CIE Colorimetric Standard Observer Model", http://kiptron.psyc.virginia.edu/steve_boker/ColorVision2/node17.html, Feb. 1995.

Adobe Systems Incorporated: "Color Models—CIEXYZ", http://www.adobe.com/support/techguides/color/colormodels/ciexyz.html, 2000.

Charles A. Poynton: "*Gamma* and its Disguises: The Nonlinear Mappings of Intensity in Perception, CRTs, Film and Video", *SMPTE Journal*, Dec. 1993, pp. 1099-1108.

U.S. Appl. No. 10/637,246. "Method and Apparatus of Improved Color Correction". Inventors: Kok Chen, Gabriel Marcu, and Steve Swen.

\* cited by examiner

METHOD AND APPARATUS FOR IMPROVED COLOR CORRECTION

This application is a continuation application of U.S. patent application Ser. No. 10/112,281, filed Mar. 29, 2002 now U.S. Pat. No. 6,844,881.

FIELD OF THE INVENTION

The invention relates to color correction, more particularly to tone ("gamma") correction for devices with multiple color channels with asimilar transfer functions between channels.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Apple Computer, Inc., 2002.

BACKGROUND OF THE INVENTION

The light intensity (Y) produced by a Cathode Ray Tube (CRT) monitor is controlled by the voltage input. A transfer function of the CRT monitor is the light intensity (Y) produced by a Cathode Ray Tube (CRT) monitor varying with respect to the voltage input (V). Typically, the transfer function of a CRT monitor is in the form of a power law ($Y=V^\gamma$). The exponent of the power law, $\gamma$, is frequently referred to as the gamma of the CRT monitor. The theoretical value of the gamma of a CRT monitor, dictated by the physics of the electron gun of a CRT monitor, is 2.5. Thus, a linear variation in voltage input (V) results in a nonlinear variation in light intensity (Y) in the form of a power law. On a color CRT monitor, red, green and blue phosphors are driven independently by corresponding signals. The light intensities produced by the phosphors in response to the corresponding signals follow the same power law.

A computer system may have a nonlinear built-in unit that is closely associated with the CRT monitor (e.g., a graphics controller, or circuitry in the monitor) such that the light intensity produced by the CRT monitor varies with respect to the input digital signal to the display device in the form of a power law controlled by a gamma different from the gamma for the CRT monitor. For example, a typical Apple Macintosh display has a gamma close to 1.8; and a typical PC display has a gamma close to 2.2. Thus, different display devices have different nonlinearities (different gammas) in their transfer functions.

In this description, the transfer function per channel of the uncompensated device is referred as native transfer function. The native transfer function is assumed to be different from the desired device transfer function, that is referred as target transfer function. The process of pre-compensating for the nonlinearity in the native transfer function of a display device to a target transfer function is known as gamma correction. With a gamma correction, an input digital signal is mapped by a correction function to a corrected signal such that, when the corrected signal is applied to the display system, the light intensity produced by the display device varies with respect to the input digital signal in the form of a power law with a target gamma. With the gamma correction, the display system behaves as if the transfer function of the system has the target gamma. In case of multiple color channel devices, gamma correction is a unidimensional correction applied per channel. This means that the input signal from one channel is mapped into an output signal for that channel. The correction function is computed based on the native transfer function of the device measured as a correlate of the intensity of light (luminance or density) with the input signal. The intensity of light is used only, neglecting the chrominance information.

In general, a gamma correction maps input signals representing the intensity of a light to corrected signals using a nonlinear function. Gamma corrections may be applied to signals for display devices, as well as signals to or from other color related devices, such as scanners, printers, video cameras, and others. Thus, a gamma correction changes or encodes the nonlinearity in signal intensity in each of the color signals using a nonlinear unidimensional mapping function for each channel.

On a color CRT display, since the native transfer functions of the three different color components (e.g., red, green and blue in a RGB color space) of a CRT display follow the same power law, a single parameter gamma correction in the form of a power law can be used to map the input signals of each color channel to the corrected signals.

However, some display devices, such as twisted nematic Thin-Film Transistor Liquid-Crystal Displays (TFT LCD), have asimilar transfer functions for different color components. Thus, different unidimensional correction functions are required to correct the asimilar transfer functions to similar target transfer functions. A conventional gamma correction applies different unidimensional correction functions to the input signals for different color components; and the different unidimensional correction functions are derived independently from each other from the native transfer functions and the target transfer functions. Not only that, but the TFT LCD devices show a different native transfer function than a power law requiring table based gamma compensation. Typically, these unidimensional correction functions are in the form of unidimensional look-up tables that map the input digital signals to the corrected signals. Because of the asymmetry of the RGB channels, the gray balance of those devices is poor. Due to the human visual system sensitivity to color differences, small asymmetries in the color balance associated with gray color rendition, is usually perceived as a hue shift over the grays. This hue shift is known as color cast and is visible in the form of bluish or reddish grays depending on the color asymmetry on that device. Additionally, in many cases, TFT LCD devices may show a variation of the chromaticity of the primary colors with the input signal. In case of gamma correction per channel based on light intensity only per channel, when all compensated channels are combined to represent a gray, the combined compensations may conduct to noticeable hue shift for different input signal levels.

SUMMARY OF THE INVENTION

Methods and apparatuses for performing gamma corrections on multichannel devices to maintain a plurality of colors substantially consistent with a color point are described here.

In one aspect of the present invention, a method to generate unidimensional correction functions for performing color correction for a multichannel device for signals of different color components in a color space includes: generating a first correction function for a first color component in the color space; and generating second correction functions for second color components in the color space by reducing first color differences between a target white point and the white points of a plurality of grays corrected by the first and second correction functions. The second color components are the color components in the color space other than the first color component. The first color differences are minimized relative to a chromaticity diagram. In one example, the device is a color producing device (e.g., a display, or a printer); and the plurality of grays are colors produced by the device. In another example, the device is a color sensing device (e.g., a scanner or a video camera); and the plurality of grays are colors being quantified by the device.

In another aspect of the present invention, the gamma correction functions are generated using both the luminance and chromaticity values relative to the device. The correction functions are generated by modifying values of several color components interdependently to maintain a substantially consistent white point over a plurality of gray levels from a white to a black. The correction functions for different color components are derived interdependently by minimizing the color differences between a target white point and the white points corresponding to a plurality of grays from a white to a black and by correcting the transfer function of the first channels relative to a target transfer function.

In one example, the first correction function for the first color component is generated for gamma correction in the presence of signals for the first color component and in the absence of signals for the second color components. In another example, the first correction function for the first color component is generated for gamma correction for luminance in the presence of signals for the color components of the plurality of grays. The first color component is Green in a RGB color space.

In a further example, third functions of the second color components as functions of the first color component are determined by reducing second color differences between a target white point and the white points corresponding to the first color components of different magnitudes and the second color components as determined by the third functions. The second color differences are minimized relative to a chromaticity diagram; and the second correction functions are generated from combining the first correction function and the third functions.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
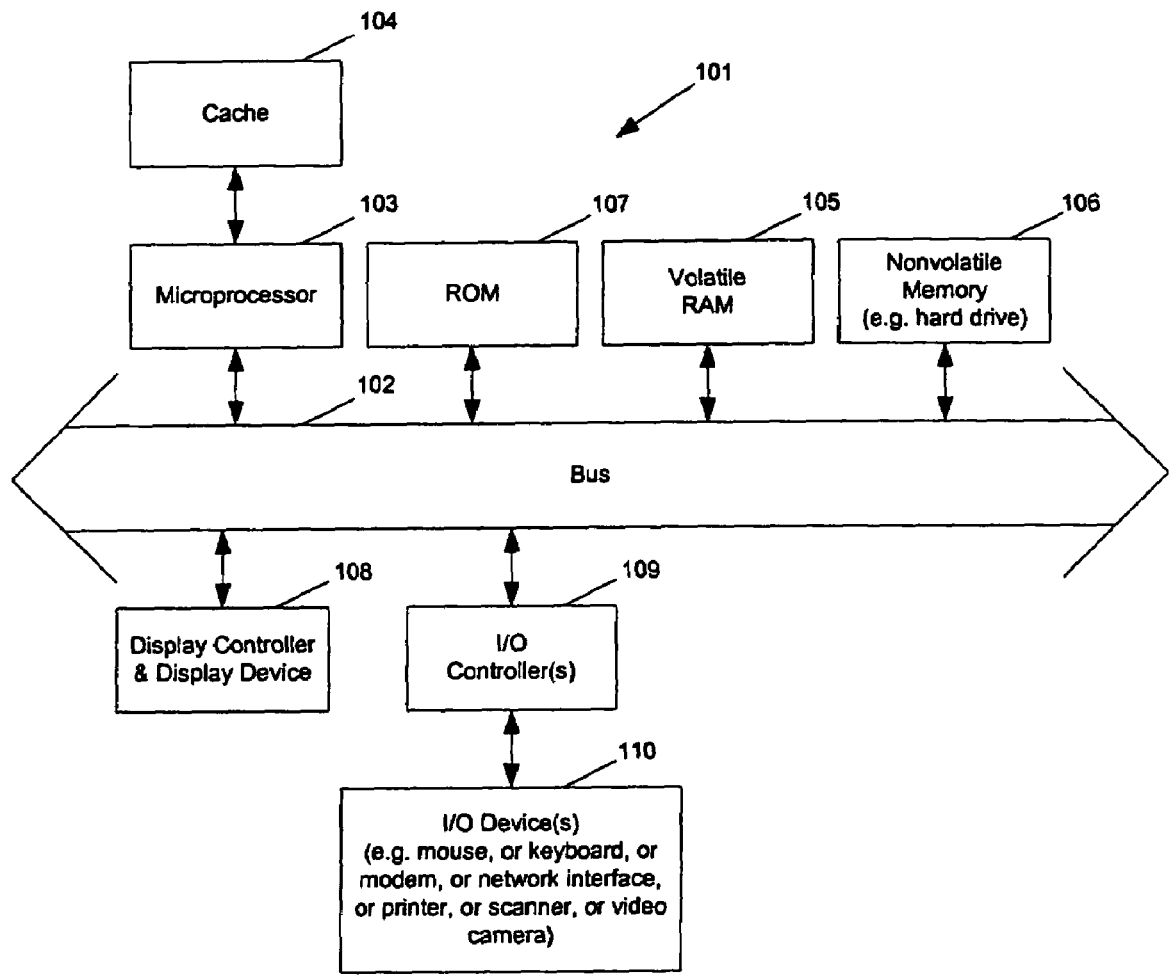
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 2:
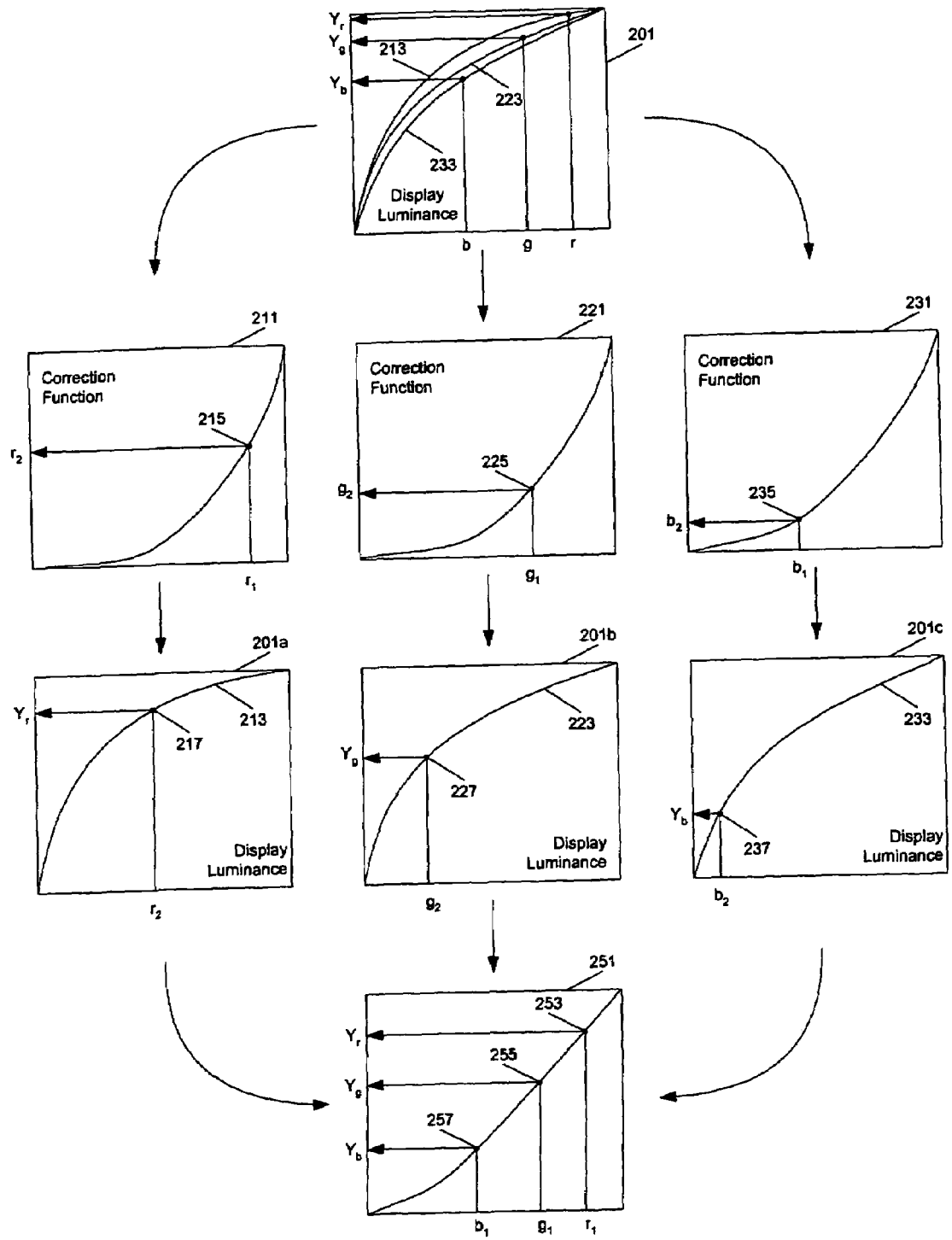
FIG. 2 illustrates a typical method for color gamma correction.

FIG. 2 illustrates a typical method for color gamma correction. When normalized, the same input signal for different color components results in light of different luminance values on a typical TFT LCD display. For example, curves 213, 223 and 233 in graph 201 correspond respectively to transfer functions for Red (R), Green (G) and Blue (B) components in a RGB color space. For example, when the Blue signal is b, curve 233 shows the luminance of the display ($Y_b$) in the absence of the Red and Green signals. In order to correct the transfer functions in graph 201 to the normalized target transfer functions in graph 251, different unidimensional correction functions, shown in graphs 211, 221, and 231, are derived independently from the corresponding native transfer functions in graph 201. Correction function 215 corrects the input Red signal from $r_1$ to $r_2$; correction function 225 corrects the input Green signal from $g_1$ to $g_2$; and correction function 235 corrects the input Blue signal from $b_1$ to $b_2$. When the corrected signal levels $r_2$, $g_2$ and $b_2$ are applied to the display, the native transfer functions of the display (in graph 201) determine the luminance of the light produced on the display. Graphs 201*a*, 201*b* and 201*c* show the transfer functions 213, 223 and 233 for the Red, Green, and Blue signals respectively. Signal levels $r_2$, $g_2$ and $b_2$ correspond to points 217, 227 and 237 on the native transfer functions 213, 223 and 233 and, therefore, to luminance levels $Y_r$, $Y_g$, and $Y_b$ respectively, which in turn correspond to the luminance levels at points 253, 255 and 257 in graph 251. Thus, with the gamma correction functions 215, 225, and 235 illustrated in graphs 211, 221 and 231, the display system exhibits the normalized transfer functions as shown in graph 251, where all the target transfer functions for the three color components coincide with each other. Thus, from the target transfer functions as shown in graph 251, one can derive the correction functions 215, 225 and 235 independently from the native transfer functions 213, 223 and 233 respectively. For instance, for input Blue signal level $b_1$, luminance level $Y_b$ is determined from the target transfer function 257 in graph 251. From the native transfer function 233 in graph 201*c*, the corrected signal level $b_2$ is determined from point 237, which has the required luminance level $Y_b$. Thus, point 235 on the correction function for Green in graph 231 is determined.

Due to the similar transfer functions for RGB color components for a color CRT display, such a gamma correction operation ensures inherently the stability of the white point corresponding to digital signals for various gray levels. Thus, the colors produced on the CRT display by the digital signals corresponding to various gray levels coincide with a reference white point, or stay in the vicinity of the reference white point. However, when the conventional gamma correction is performed for twisted nematic TFT LCD displays, the white point of the display varies when the input gray level varies from white to black, due to the asymmetry of the transfer functions for different color components.

At least one embodiment of the present invention seeks to perform gamma corrections by utilizing both the luminance and the chromaticity properties of a display device. The correction functions for different color components are derived interdependently from the luminance and the chromaticity data of the display device such that gamma corrections maintain a substantially consistent white point over a plurality of gray levels from a white to a black.

Figure 3:
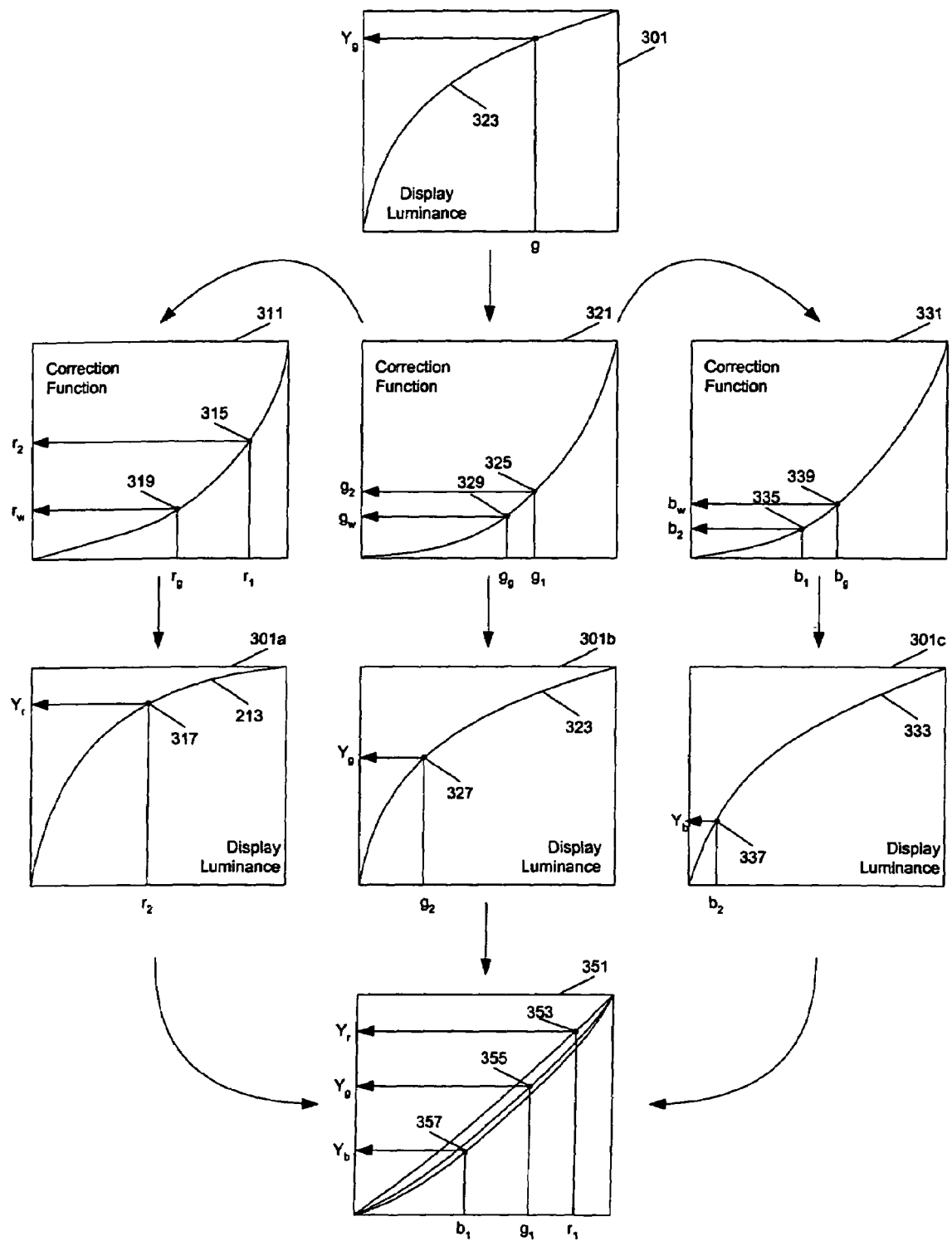
FIG. 3 illustrates a method to perform gamma correction according to one embodiment of the present invention.

FIG. 3 illustrates a method to perform gamma correction according to one embodiment of the present invention. In this embodiment, a correction function is first derived for one of the color components (e.g., from the native transfer function of the device). For example, a correction function for color component Green is derived from the native transfer function 301 in graph 301. Green is preferred, since the dominant contribution to the luminance of a gray is from the component Green. Thus, correction function 325, illustrated in graph 321, can be determined from the native transfer function 323 and from the target transfer function 355 in graph 351, using a method similar to that described above for determining correction function 225 in graph 221. However, the correction functions for the other components are derived from the correction function 325 to ensure the stability of the white point corresponding to digital signals for various gray levels. Instead of being derived from the target transfer function and the corresponding native transfer functions, the correction functions 315 and 335 are derived from the correction function 325 to maintain a substantially consistent white point over a plurality of gray levels from a white to a black. For example, for a gray level corresponding to input Red, Green and Blue levels $r_g$, $g_g$ and $b_g$, the color difference between a white point and the color produced by corrected color levels $r_w$, $g_w$ and $b_w$ is reduced or minimized. Since the correction function 325 determines the corrected Green level $g_w$, the corrected red and blue levels ($r_w$ and $b_w$) can be adjusted such that the color produced by the corrected color levels ($r_w$, $g_w$ and $b_w$) corresponds to a white point, or is as close to a white point as possible. When corrected color levels for a plurality of gray levels are determined, correction functions 315 and 335 can be determined. When the correction functions 315 and 335, derived from the correction function 325 with the criterion to minimize the color difference between the color produced by the corrected color levels for grays and a white point, are used on the display system, the combination of the correction functions and the native transfer function typically results in different target transfer functions for different color components. For example, the target transfer functions 353, 355 and 357 for color components Red, Green and blue respectively, as shown in graph 351, do not coincide with each other.

Figure 4:
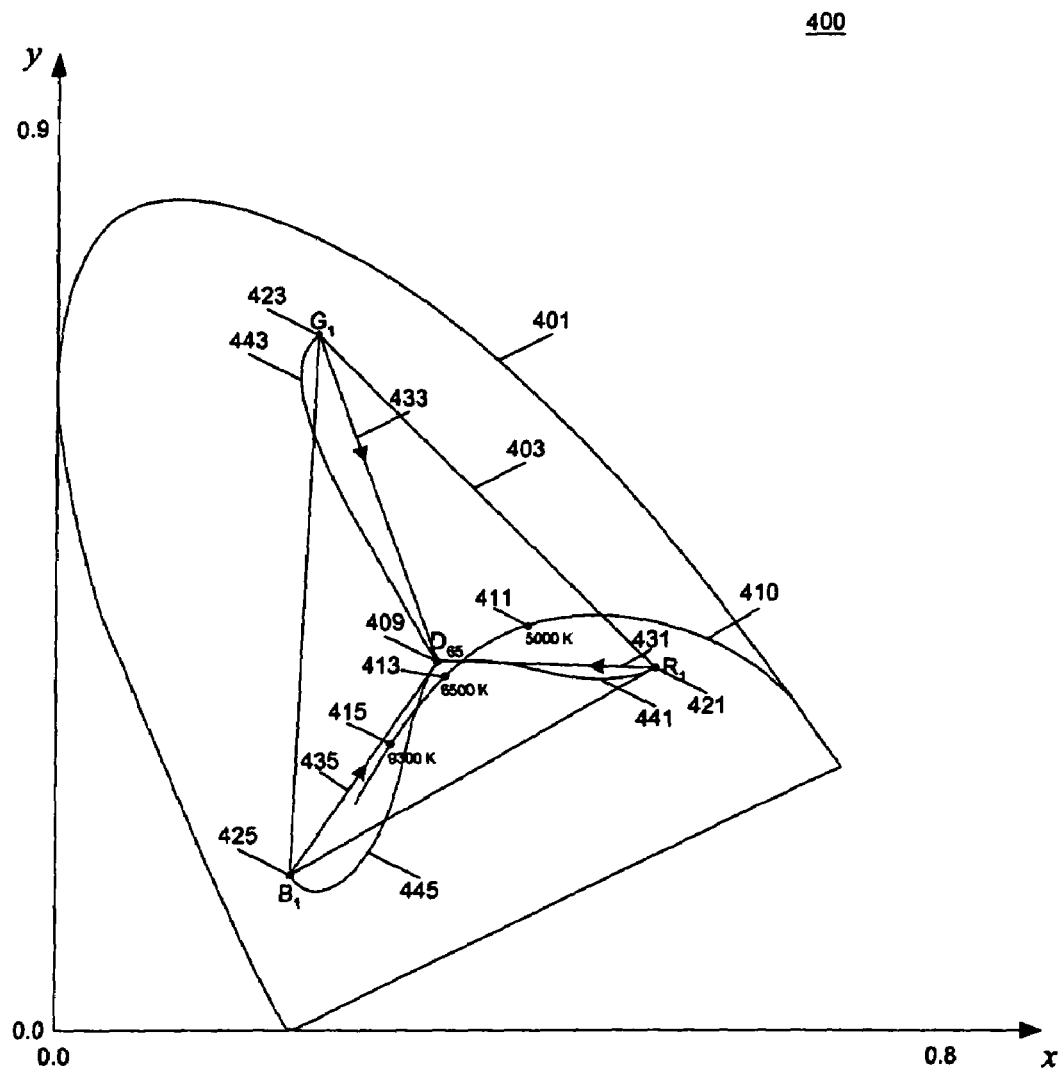
FIG. 4 illustrates a chromaticity diagram showing display characteristics of various devices.

FIG. 4 illustrates a chromaticity diagram showing display characteristics of various devices. In a CE (Commission International d'Eclairage) 1931 chromaticity diagram, the horseshoe-shaped color space 401 represents the colors visible to a standard observer. Curve 410 represents the black body curve, which represents the color of the light emitted by a theoretical "black body at different absolute temperatures (in degrees Kelvin). The light emitted from the black body represents white light with different hues, ranging from reddish at low temperatures (e.g., 5000 K. at point 411) to bluish at high temperatures (e.g., 9300 K. at point 415). Point 413 on the black body curve represents the white light emitted from a black body at 6500 K. Slightly off the black body curve, point 409 ($D_{65}$) is the reference white for NTSC television.

In the absence of green and blue signals, a display produces a saturated red when the red signal reaches the maximum level. The saturated red is represented by point 421 ($R_1$). Similarly, points 423 ($G_1$) and 425 ($B_1$) represent the saturated green and blue. In the absence of green and blue signals, a CRT display may produce a different red color when the red signal is not at the maximum level. As the red signal reduces from the maximum level to zero, the red color produced by the CRT display under white ambient light typically stays at or near point $R_1$ (421) and then moves quickly along path 431 toward white point $D_{65}$ (409). Similarly, the light produced by the green signal stays at or near point $G_1$ (423) and moves quickly toward $D_{65}$ (409) along path 433, as the green signal reduces from the maximum level to zero; and the blue light moves from B1 (425) toward $D_{65}$ (409) along path 435. Thus, when balanced input signals for a gray is applied on the display, the combined red, blue and green light produced by the CRT display typically has a stable white point on or near the native white, which in this example was selected for illustration purposes as $D_{65}$ (409). Since the color produced by the CRT monitor is the mixture of the light emitted from the red, green and blue phosphors, triangular 403 represents the colors that can be produced by the CRT monitor.

However, some display devices, such as twisted nematic TFT LCD displays, have different display characteristics. In the absence of green and blue signals, the red light emitted from the display moves along a different path, such as path 441, toward the white point $D_{65}$, as the red signal reduces from the maximum level to zero. Instead of staying at or near $R_1$ (421), the red light moves near the saturated red. Similarly, the green and blue light move along paths 443 and 445 respectively. As a result, when balanced red, blue and green signals for a gray are applied on the display, the color produced by the signals does not coincide with the white point $D_{65}$. When the gray level changes from a white to a black, the color produced by the signals moves around the reference white point.

In one scenario, balanced red, blue and green signals for a display device produce a white point consistent gray. However, due to the difference in native transfer functions, conventionally gamma corrected signals from balanced red, blue and green signals are not unbalanced, resulting in a white point inconsistent gray after gamma correction. Because native transfer functions are different, a conventional method requires different correct functions $f_1$, $f_2$, $f_3$ for RGB. Thus, balanced uncorrected signals (r=g=b) result in unbalanced corrected signals $f_1(r)$, $f_2(g)$, and $f_3(b)$.

In another scenario, a white point consistent gray must be created on a display device with unbalanced red, blue and green signals. In this case, conventional approach for gamma correction, in general, cannot produce signals for generating white point consistent gray levels.

Thus, at least one embodiment of the present invention seeks to gamma correct input signals such that the gamma corrected signals for a gray produces a white point consistent color on a target display device.

Figure 5:
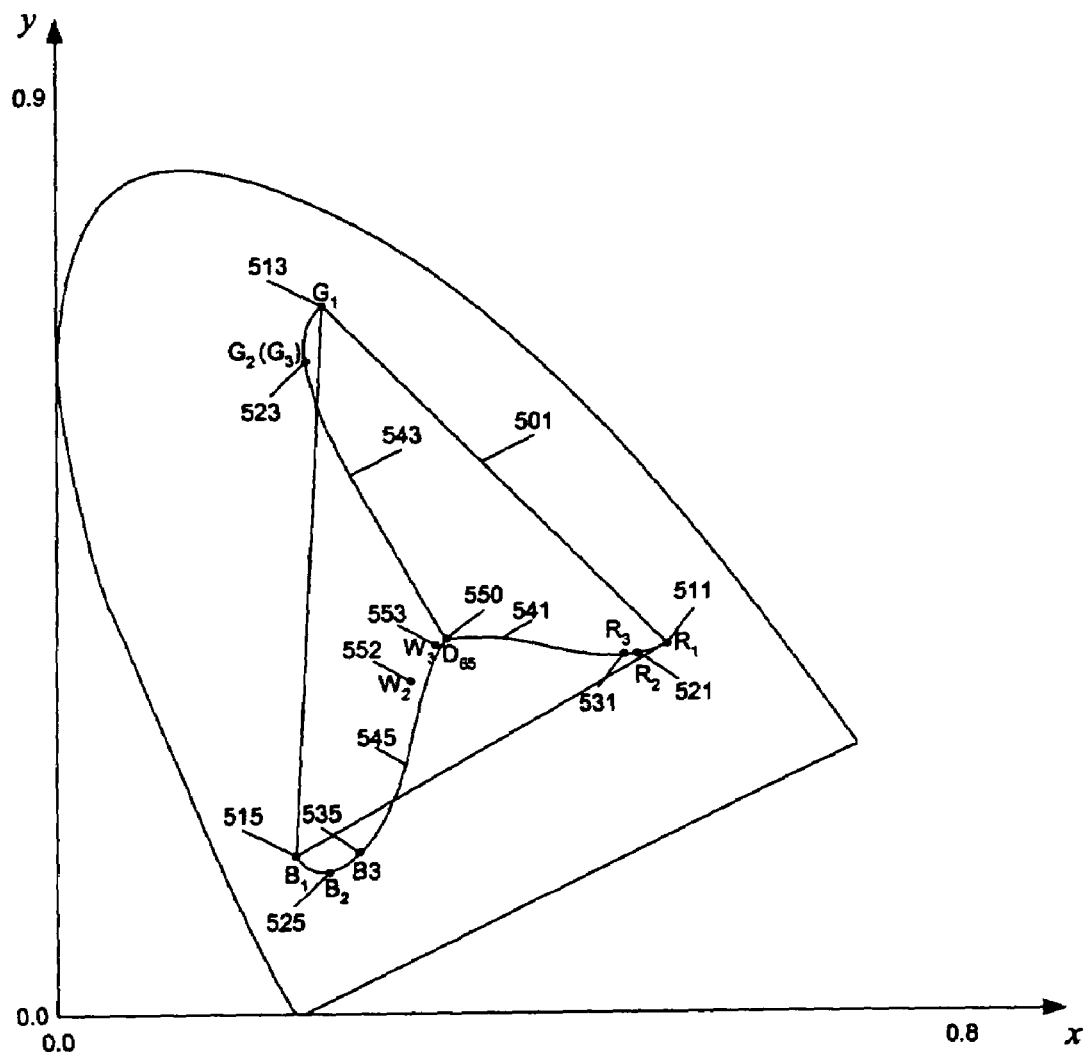
FIG. 5 illustrates a method to determine color components that corresponding to a color which are close to white points according to one embodiment of the present invention.

FIG. 5 illustrates a method to determine color components that corresponding to a color which are close to white points according to one embodiment of the present invention. In FIG. 5, $R_1$ (511), G1 (513) and $B_1$ (515) represent the saturated red, green and blue produced by a display; paths 541, 543 and 545 represent the colors of the red, green and blue light produced by the display at different levels of input signals; and $D_{65}$ (550) represents an example of the target white point. Using a conventional approach, red, green and blue signals for a gray is corrected independent from each other to produce colors represented by $R_2$ (521), $G_2$(523) and $B_2$ (525). The mixture of the red, green and blue light represented by $R_2$ (521), $G_2$(523) and $B_2$ (525) corresponding to equal Red, Green, Blue signals produces a color $W_2$ (552), which is very different from the target white $D_{65}$. According to one embodiment of the present invention, the signal for Green is corrected to produce green light $G_2$ (523). However, the signals for red and blue are corrected such that the corrected signals produce red $R_3$ (531) and blue $B_3$ (535) on the display. Thus, the mixture of $R_3$ (531), $G_2$ (523) and $B_3$ (535) produces $W_3$ (553), which is substantially consistent with the target white point $D_{65}$. Preferably, $W_3$ (553) coincides with the white point $D_{65}$. However, on some devices or for some gray levels generating colors close to black it may not be possible to adjust $R_3$ and $B_3$ along paths 541 and 545 such that $W_3$ (553) coincides with the target white point $D_{65}$.

Notice that a color difference between two colors can be quantified using the distance between the points representing the colors in a chromaticity diagram. This metric was used because for most TFT LCD devices it is possible to adjust $R_3$ and $B_3$ along paths 541 and 545 such that $W_3$ (553) physically coincides with the target white point. A proper metric system can also be used in computing the distance. For example, in one metric system, such as a Stiles system, if two neighboring points are just noticeably different colors on the chromaticity diagram, the line element connecting the two points has the same constant value along its length. When such a metric system is used, a minimization process can produce a better solution than that produced without using a metric system. Color difference formula such as ΔE defined in CIE L*a*b* or CIE L*u*v* can be also used. Also color difference can be estimated visually and minimized through visual feedback. In such implementation Red and Green adjustments are used to adjust $R_3$ and $B_3$ along paths 541 and 545 such that the best visual match is obtained between the target white point and the gray white point resulted by the color mixture of Red, Green and Blue color components. Such implementation can be used in a visual gamma correction application.

Figure 6:
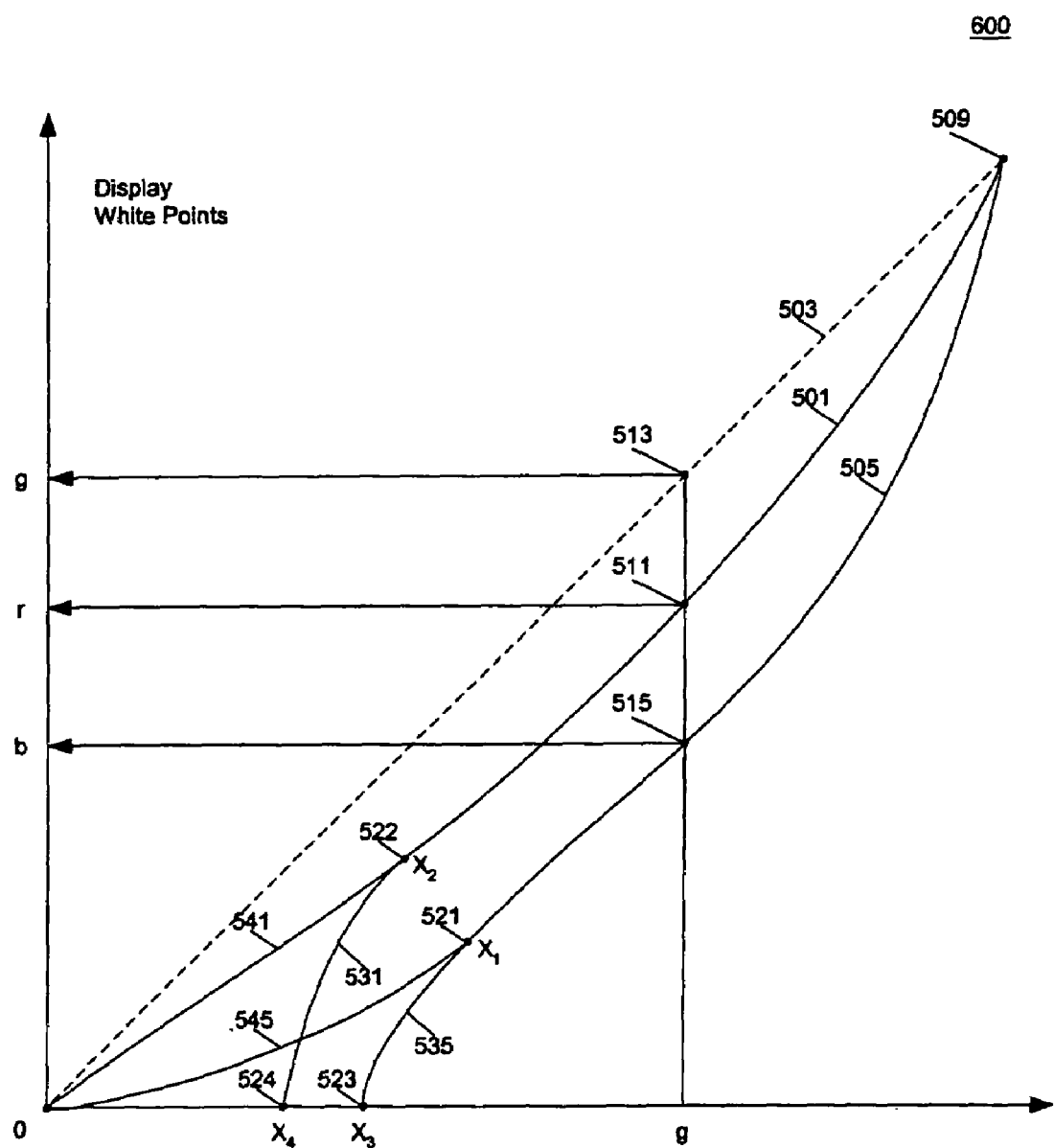
FIG. 6 illustrates a method of generating color components that corresponding to colors which are close to white points according to one embodiment of the present invention.

FIG. 6 illustrates a method of generating color components that corresponding to colors which are close to white points according to one embodiment of the present invention. For a given green signal level g, curves 501, 503, 505 show the signal levels for red, green and blue on points 511, 513 and 515 that can produce on the display a color that coincides with a target white point on a chromaticity diagram. Due to the limitation of the display device, at a certain range of green signal, it may not be possible to have corresponding red and blue signal levels that can produce a white point consistent gray on the device. For example, white point consistent signal levels for red and blue may follow curves 531 and 535 after points $X_2$ (522) and $X_1$ (521). Thus, it may be desirable to construct curves 541 and 545 such that the produced colors for the gray levels are substantially consistent with the white point while the overall curves are monotonic, varying substantially smoothly. The correction for monotonicity and smoothness is however applied for very dark grays, close to a black color where the human visual system sensitivity to color is much reduced.

Figure 7:
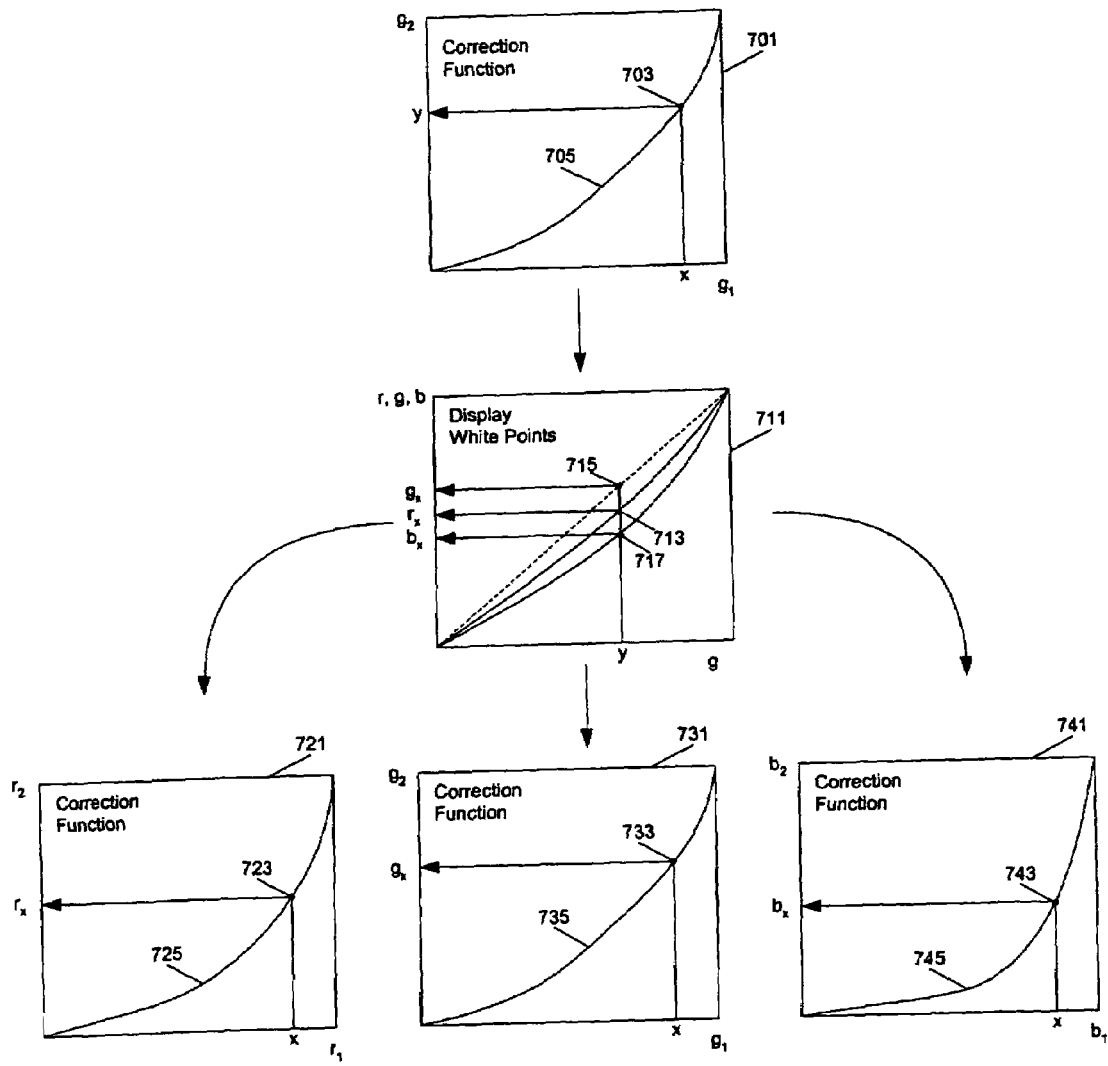
FIG. 7 illustrates a method of generating color correction functions from a color correction function for one color component according to one embodiment of the present invention.

FIG. 7 illustrates a method of generating color correction functions from a color correction function for one color component according to one embodiment of the present invention. Graph 701 shows a correction function for green signal level (e.g., generated according to a traditional method). When the same correction function 705 is also applied to red and blue signals, balanced red, green and blue signals for a gray level will remain balanced. Graph 711 shows the signal levels for producing substantially white point consistent gray levels (e.g., generated using a method as illustrated in, and described with, FIG. 6). Thus, balanced signals can be corrected by curves 713, 715 and 717 to produce white point consistent gray levels. Combining correction function 705 and white point curves 713, 715 and 717 lead to correction functions 725, 735 and 745 for red, green and blue signal levels. For example, point 723 on correction curve 725 for red can be determined from the positions of point 703 on the correction curve 705 for green and point 713 on the white point curve for red. Similarly, points 703 and 717 determine the position of point 743 for the correction function for blue.

Figure 8:
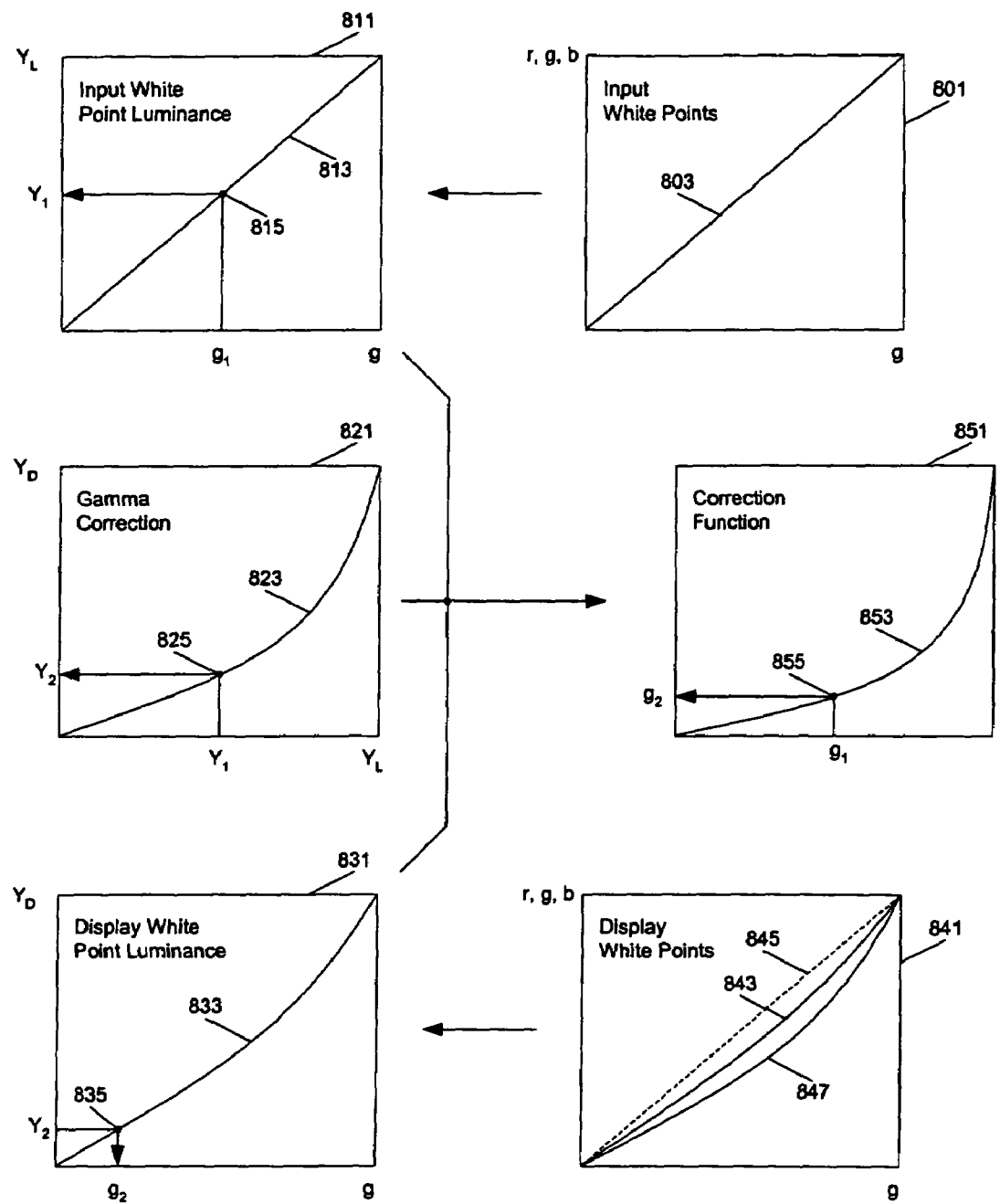
FIG. 8 illustrates a method to generate a color correction function for one color component according to one embodiment of the present invention.

FIG. 8 illustrates a method to generate a color correction function for one color component according to one embodiment of the present invention. In such an embodiment of the present invention, it is desirable to gamma correct the signals such that the luminance of gray levels is corrected to a target gamma. In graph 801, balanced uncorrected signal for gray levels from a white to a black is shown by line 803. Thus, the luminance represented by the uncorrected signals for various gray levels can be determined as shown by line 813 in graph 811. Therefore, an input green signal level $g_1$ for a gray level corresponds to luminance level $Y_1$ at point 815. On the other hand, graph 841 shows the signal levels 843, 845 and 847 for producing white point consistent gray levels on the target display. Thus, the luminance values of the white point consistent gray levels produced on the display can be determined as a function of corrected signal level for green. For example, when the green signal level is $g_2$ for producing a white point consistent gray level, point 835 shows the luminance $Y_2$ of the white point consistent gray level on the device. In order to gamma correct the input luminance $Y_1$ to the target luminance $Y_2$, as shown by point 825 on curve 823 in graph 821, a correction function 853 for the green signal level can be determined. For example, point 855 on curve 853 in graph 851 for input green signal $g_1$ can be determined from: 1) determining $Y_1$ from point 815; 2) determining $Y_2$ from point 825; and 3) determining $g_2$ from point 835. Once the correction function 853 for green is determined, it can be combined with the white point curves in graph 841 to derive the correction functions for the other color components, as illustrated in FIG. 7.

Figure 9:
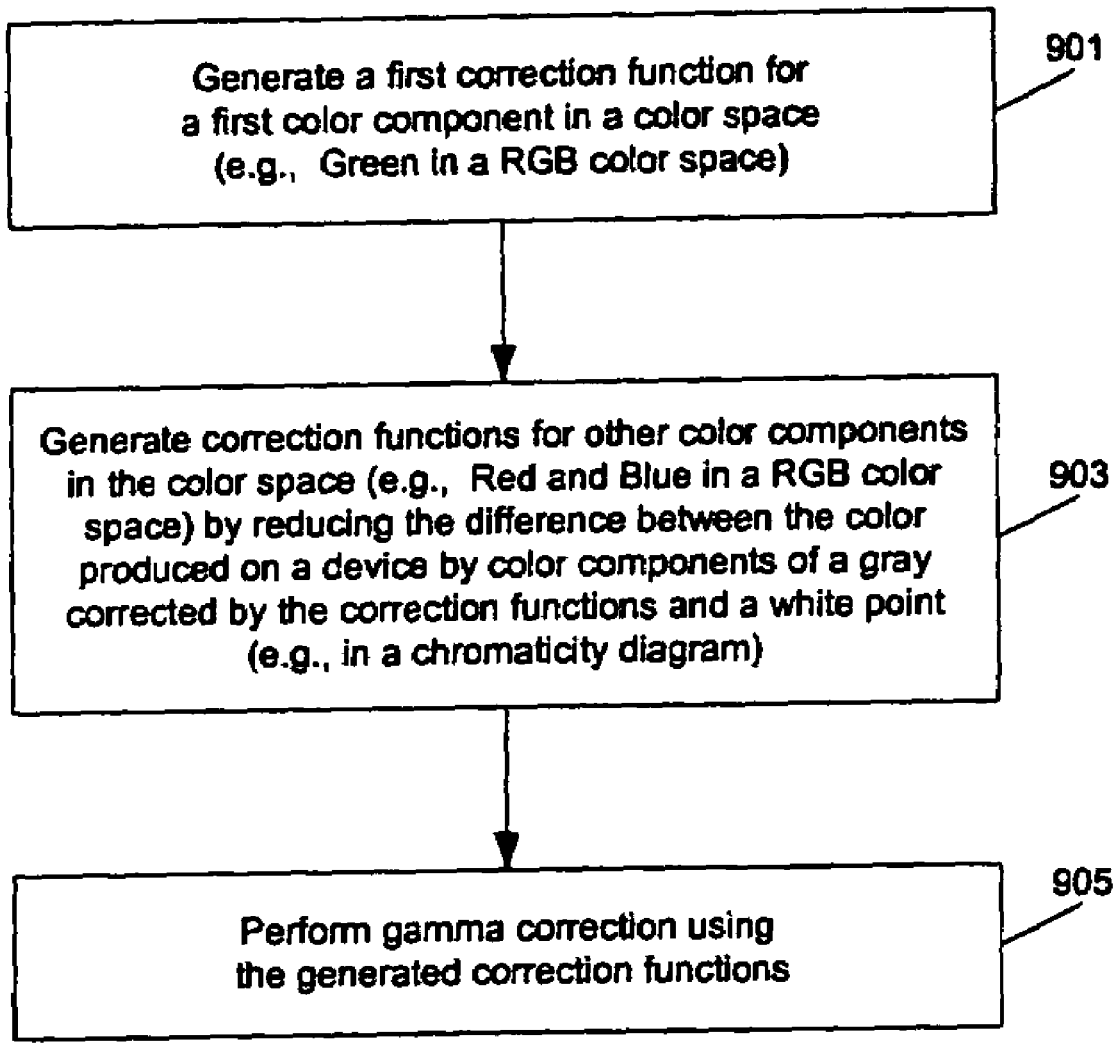
FIG. 9 shows a flow diagram for a method to generate color correction functions for color components in a color space according to one embodiment of the present invention.

FIG. 9 shows a flow diagram for a method to generate color correction functions for color components in a color space according to one embodiment of the present invention. Operation 901 generates a first correction function for a first color component in a color space (e.g., Green in a RGB color space). It can be generated from the native transfer function and the target transfer function for the first color component using a traditional method; or, it can be generated using a method according to the present invention (e.g., a method as illustrated FIG. 8). Typically, luminance property data of the display is used to generate the first correction function. Operation 903 generates correction functions for the other color components in the color space (e.g., Red and Blue in a RGB color space) by reducing the difference between the color produced on a device by color components of a gray corrected by the correction functions and a target white point (e.g., in a chromaticity diagram). Typically, chromaticity property data of the display is used to generate the correction function for the other color components. Operation 905 performs gamma correction using the generated correction functions. By reducing the color difference in operation 905, the generated correction functions ensure the signals representing gray levels produce white point consistent grays on the display once the correction functions are applied.

Figure 10:
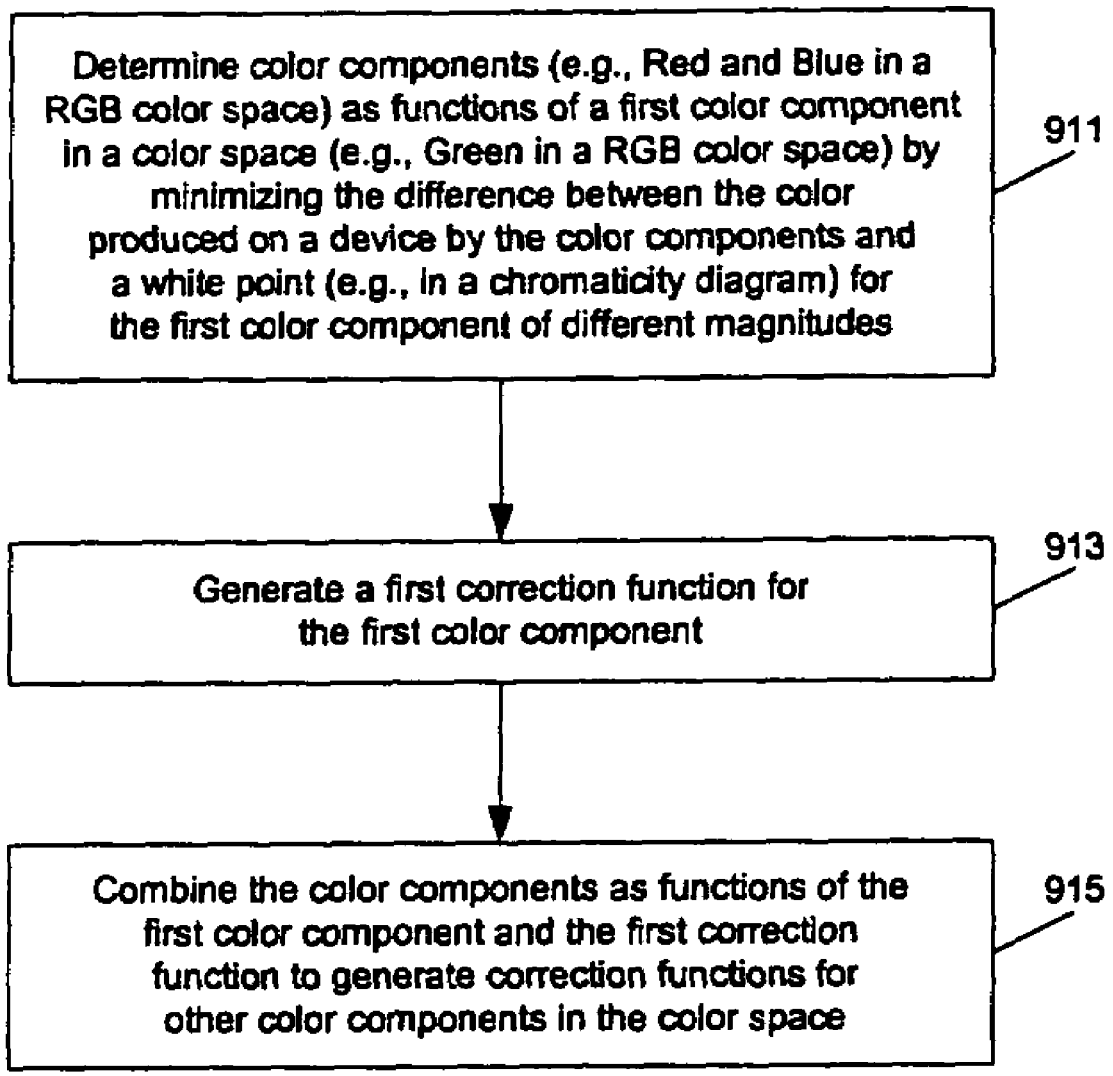
FIG. 10 shows a flow diagram for another method to generate color correction functions for color components in a color space according to one embodiment of the present invention.

FIG. 10 shows a flow diagram for another method to generate color correction functions for color components in a color space according to one embodiment of the present invention. Operation 911 determines the color components (e.g., Red and Blue in a RGB color space) as functions of a first color component in the color space (e.g., Green in a RGB color space) by minimizing the difference between the color produced on a device by the color components and a target white point (e.g., in a chromaticity diagram) for the first color component of different magnitudes. Chromaticity property data of a display device is typically used to generate these white point curves, which specify the other color components in terms of the first color component for producing grays with consistent white points on the device. Operation 913 generates a first correction function for the first color component; and operation 915 combines the color components as functions of the first color component and the first correction function to generate correction functions for other color components in the color space.

Figure 11:
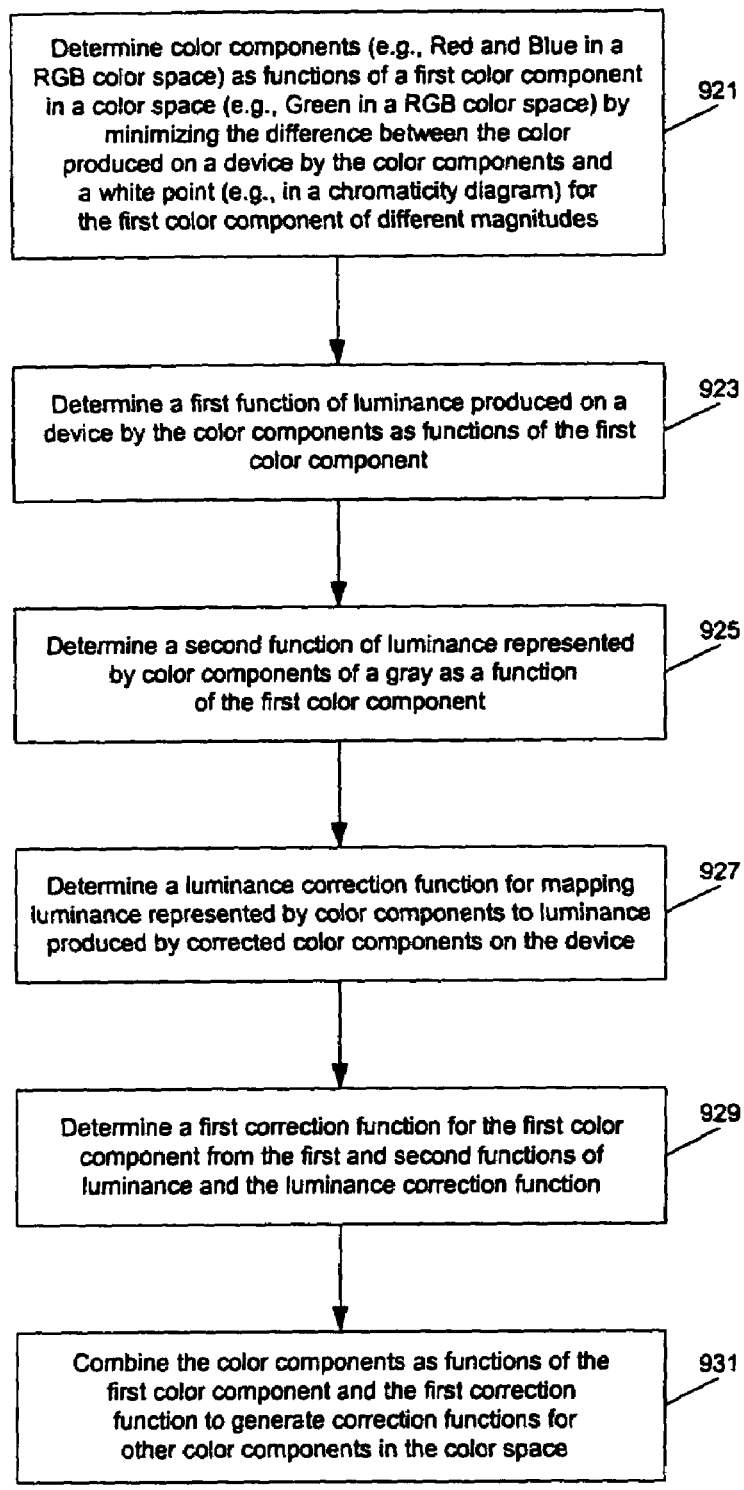
FIG. 11 shows a detailed flow diagram for a method to generate color correction functions for color components in a color space according to one embodiment of the present invention.

FIG. 11 shows a detailed flow diagram for a method to generate color correction functions for color components in a color space according to one embodiment of the present invention. Operation 921 determines color components (e.g., Red and Blue in a RGB color space) as functions of a first color component in a color space (e.g., Green in a RGB color space) by minimizing the difference between the color produced on a device by the color components and a target white point (e.g., in a chromaticity diagram) for the first color component of different magnitudes. After the white point curves are generated from operation 921, operation 923 determines a first function of luminance produced on a device by the color components as functions of the first color component. The first function of luminance represents the luminance of the white point consistent grays on the device as a function of the first color component. Operation 925 determines a second function of luminance represented by color components of a gray as a function of the first color component. The second function of luminance represents the luminance of the input signal as a function of the first color component. Operation 927 determines a luminance correction function for mapping luminance represented by color components to luminance produced by corrected color components on the device. The luminance correction function corrects the input luminance to the target luminance. Operation 929 determines a first correction function for the first color component from the first and second functions of luminance and the luminance correction function; and operation 931 combines the color components as functions of the first color component and the first correction function to generate correction functions for other color components in the color space. Thus, the correction functions generated according to the method in FIG. 11 gamma correct the light intensity of gray levels while maintaining the color of the gray levels substantially consistent with a white point.

Although various examples are illustrated for gamma correction in RGB color space for displaying colors on a display device, it is apparent to one skilled in the art that the methods according the present invention can be applied to color corrections for color components represented in device dependent color spaces for various purpose. When the target device is a color producing device, such as a display or a printer, the color producing properties in luminance and chromaticity can be used to generate gamma correction functions according to the various methods of the present invention. When the target device is a color sensing device, such as a scanner or a video camera, the color sensing properties in luminance and chromaticity can be used to generate gamma correction functions according to the various methods of the present invention. Although various illustrated examples use correction functions to generate white point consistent gray levels, it would be apparent to one skilled in the art that the correction functions can be generated to maintain a substantially consistent color point (e.g., a color point as defined in a chromaticity diagram in the xy color space, which is a subspace of the xyY color space) over a plurality of colors.

Following is the source code for a method to compute the look-up tables that balance the R and B components of a color signal in a RGB color space for a target white point (e.g., $D_{65}$). A simple (Euclidean) color distance is used in minimizing the color differences between the target white point ($D_{65}$) and the colors corrected by the look-up tables.

```
// structure to hold the chromaticity and the luminance value
typedef struct {
    float      fx;              // x CIE chromaticity value
    float      fy;              // y CIE chromaticity value
    float      fY;              // Y Luminance value
} CIEColor;
/*_____*/
// This function computes the additive mixture of 2 colors
void
AdditiveMix    (
    float x1, float y1, float Y1,       // input 1, chromatic & luminance info
    float x2, float y2, float Y2,       // input 2, chromatic & luminance info
    float *xc, float *yc, float *Yc     // output, chromatic & luminance info
    )
{
    fa = (Y2/y2) / ( Y1/y1 + Y2/y2 );
    *xc = x1 + (x2 − x1) * fa;
    *yc = y1 + (y2 − y1) * fa;
    *Yc = Y1 + Y2;
}
/*_____*/
// This function computes the look-up tables that balance the R and B for
// the target white point, in this case, D65.
void
LUTCorrection(
    int          niSamples,       // number of samples per channel
    CIEColor     *R,              // Red response, chromatic and luminance info
    CIEColor     *G,              // Green response,    chromatic and luminance info
    CIEColor     *B,              // Blue response, chromatic and luminance info
    CIEColor     *W,              // Gray response, chromatic and luminance info
    int          *rLUT,           // output R look-up tables
    int          *gLUT,           // output G look-up tables
    int          *bLUT            // output B look-up tables
    )
{
    int      i, j, k,im,jm, ;
    float    fx, fy, fY, fx1, fy1, fY1, fD, fDm, fDx, fDy,
             fxw = 0.3127, fyw = 0.3290;    // target white point, i.e. D65
    for(k=0; k< niSamples; k++) {
        im = 0; jm = 0;
        fDm = 2; // initial value > max distance = (1^2+1^2)^.5
        for(j=0; j< niSamples; j++) {
            for(i=0; i< niSamples; i++) {
                AdditiveMix(     R[i].fx, R[i].fy, R[i].fY,
                                 B[j].fx, B[j].fy, B[j].fY,
                                 &fx1, &fy1, &fY1 );
                AdditiveMix( G[k].fx, G[k].fy, G[k].fY,
                                 fx1, fy1, fY1,
                                 &fx, &fy, &fY );
                // a simple (Euclidean) color distance is used here
                fDx = fx − fxw ; fDy = fy − fyw;
                fD = pow( (fDx*fDx + fDy*fDy), .5 );
                if( fD < fDm ) { // retain the case of minimum error
                    fDm = fD; im = i; im = j;
                }
            }
        }
        i = im; j = jm;
        rLUT [k] = im       * 255. / (niSamples−1.);    // Red look-up table
        gLUT [k] = k        * 255. / (niSamples−1.);    // Green look-up table
        bLUT [k] = jm       * 255. / (niSamples−1.);    // Blue look-up table
    }
}
/*_____*/
```

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable media containing executable instructions and data specifying correction values for performing gamma color correction for a device for signals of different color components in a color space, said executable instructions, when executed by a digital processing system, cause said digital processing system to perform a method comprising:

applying a first correction to a first color component in the color space to derive a first corrected color component, said first correction being specified by said data; and applying a second correction to a second color component in the color space, said second correction being specified by said first corrected color component and said data;

wherein said data gamma corrects to maintain a substantially consistent white point over a plurality of gray levels from a white to a black;

wherein said data is generated without visually inspecting colors for comparison.

2. A media as in claim 1 wherein said device displays colors; and wherein said data is generated using both luminance and chromaticity values relative to said device.

3. A media as in claim 1 wherein said device displays colors and wherein said data is generated by modifying values of several color components interdependently.

4. A media as in claim 1 wherein said plurality of gray levels are displayable by said device.

5. A method of performing color correction with data specifying correction values for performing gamma color correction for a device for signals of different color components in a color space, the method comprising:

applying a first correction to a first color component in the color space to derive a first corrected color component, said first correction being specified by said data; and applying a second correction to a second color component in the color space, said second correction being specified by the first corrected color component and said data;

wherein said data gamma corrects to maintain a substantially consistent color point over a plurality of colors from a first color to a second color;

wherein said data is generated without visually inspecting colors for comparison.

6. A method as in claim 5 wherein said device displays colors; and wherein said data is generated using both luminance and chromaticity values relative to said device.

7. A method as in claim 5 wherein said device displays colors and wherein said data is generated by modifying values of several color components interdependently.

8. A method as in claim 5 wherein said plurality of colors are displayable by said device.

* * * * *